US012589953B2

(12) United States Patent (10) Patent No.: US 12,589,953 B2

Benedetto et al. (45) Date of Patent: Mar. 31, 2026

(54) VACUUM CUP AND A METHOD OF PROCESSING A THIN GLASS SHEET

(71) Applicant: Pilkington Group Limited, Ormskirk (GB)

(72) Inventors: Gustavo Benedetto, Montenero di Bisaccia (IT); Nicola Ronzitti, Montenero di Bisaccia (IT)

(73) Assignee: Pilkington Group Limited, Nr. Ormskirk (GB)

( * ) Notice: Subject to any disclaimer, the term of this patent is extended or adjusted under 35 U.S.C. 154(b) by 1045 days.

(21) Appl. No.: 17/762,551

(22) PCT Filed: Sep. 25, 2020

(86) PCT No.: PCT/GB2020/052338

§ 371 (c)(1),
(2) Date: Mar. 22, 2022

(87) PCT Pub. No.: WO2021/058982

PCT Pub. Date: Apr. 1, 2021

(65) Prior Publication Data

US 2022/0363492 A1 Nov. 17, 2022

(30) Foreign Application Priority Data

Sep. 27, 2019 (EP) ..................................... 19425069

(51) Int. Cl.
B65G 49/06 (2006.01)

(52) U.S. Cl.
CPC ...... B65G 49/061 (2013.01); B65G 2249/045 (2013.01)

(58) Field of Classification Search
CPC ............ B65G 49/061; B65G 4449/045; H01L 21/6838

(Continued)

(56) References Cited

U.S. PATENT DOCUMENTS 2,351,666 A 6/1944 Cohen
2,853,333 A * 9/1958 Littell .................... B65G 47/91
294/189

(Continued)

FOREIGN PATENT DOCUMENTS

DE 19854826 A1 6/2000
DE 102014222641 A1 5/2016

(Continued)

OTHER PUBLICATIONS

International Search Report (PCT/ISA/210) and Written Opinion (PCT/ISA/237) mailed on Dec. 18, 2020, by the European Patent Office as the International Searching Authority for International Application No. PCT/GB2020/052338. (12 pages).

(Continued)

*Primary Examiner* — Paul T Chin

(74) *Attorney, Agent, or Firm* — BUCHANAN INGERSOLL & ROONEY PC

(57) ABSTRACT

A vacuum cup is described comprising a body portion having an elongate cavity and a contact surface for contacting a glass sheet to form a chamber with the elongate cavity and the glass sheet. An opening in the body portion is in fluid communication with the elongate cavity for connection to a low-pressure source so that the contact surface can form a seal with the glass sheet to attach the vacuum cup to the glass sheet. The periphery of the elongate cavity has major and minor axes orthogonal to one another, the major axis being longer than the minor axis. The periphery of the elongate cavity has first and second end portions at respective ends of the major axis, the first end portion being larger than the second end portion. Methods of using such vacuum cups to support a glass sheet during processing are also described.

17 Claims, 3 Drawing Sheets

(58) Field of Classification Search
USPC .................................................. 294/64.3, 183
See application file for complete search history.

(56) References Cited

U.S. PATENT DOCUMENTS

| | | | |
|---|---|---|---|
| 3,272,549 A * | 9/1966 | Nisula .................. | B65H 3/0883 |
| | | | 271/90 |
| 4,747,634 A * | 5/1988 | Hoke .................... | B66C 1/0293 |
| | | | 267/179 |
| 4,852,926 A | 8/1989 | Littell | |
| 4,925,225 A | 5/1990 | Dost | |
| 4,931,341 A * | 6/1990 | Haffer .................. | B66C 1/0212 |
| | | | 428/137 |
| 6,279,976 B1 * | 8/2001 | Ball ....................... | B65G 47/91 |
| | | | 279/3 |
| 7,735,339 B2 | 6/2010 | Bando | |
| 2007/0214925 A1 | 9/2007 | Nishio et al. | |

FOREIGN PATENT DOCUMENTS

| | | | |
|---|---|---|---|
| IL | 259216 A | 8/2019 | |
| JP | 3925042 B2 | 6/2007 | |

OTHER PUBLICATIONS

Search Report under Section 17 issued in corresponding Great Britain Patent Application No. GB1917800.3 by the Intellectual Property Office dated May 18, 2020. (1 page).

* cited by examiner

VACUUM CUP AND A METHOD OF PROCESSING A THIN GLASS SHEET

The present invention relates to a vacuum cup for use in supporting a glass sheet, and to a method for processing a thin glass sheet, in particular to a grinding operation of an edge of a thin glass sheet.

The use of vacuum cups in glass lifting and supporting operations is well known in the art, see for example U.S. Pat. No. 2,351,666. Vacuum cups having a circular periphery, or circular vacuum cups are often used in such operations. Vacuum cups having an oval periphery (often referred to as oval vacuum cups) are also well known. Vacuum cups with different configurations are described in U.S. Pat. Nos. 4,925,225, 4,931,341 and DE19854826A1.

It is known that the edges of a sheet of glass play an important factor in determining the strength of the sheet of glass. It is also known that fresh cut edges of a glass sheet are sharp and can cause cuts to a person.

It is known to grind the edges of a sheet of glass using mechanical means (often referred to as "edge working"), for example using a grinding wheel. The grinding wheel may be used to remove the sharp edges of the glass sheet and to provide the edge of the glass sheet with a specific type of profile, for example a C-profile.

For thin sheets of glass, it can be difficult to support the thin glass sheet during edge grinding. This is particularly difficult for large area thin glass sheets, for example having a thickness less than 1 mm and a surface area greater than 0.5 m².

The present invention aims to at least partially provide a solution to this problem.

Accordingly, the present invention provides from a first aspect vacuum cup comprising: a body portion comprising an elongate cavity and a contact surface extending around the elongate cavity for contacting a glass sheet and forming a chamber with the elongate cavity and the glass sheet, the elongate cavity having a periphery and the contact surface having an edge facing into the elongate cavity to define the periphery of the elongate cavity; there being an opening in the body portion in fluid communication with the elongate cavity such that when the chamber is formed with the glass sheet and a low-pressure source is connected to the opening in the body portion, the contact surface forms a seal with the glass sheet to attach the vacuum cup to the glass sheet; wherein the periphery of the elongate cavity has a major axis and a minor axis orthogonal to the major axis, the major axis being longer than the minor axis, further wherein the periphery of the elongate cavity has a first end portion at one end of the major axis and a second end portion at the opposite end of the major axis, wherein the first end portion of the periphery of the elongate cavity is larger than the second end portion of the periphery of the elongate cavity.

By having a vacuum cup configured in accordance with the first aspect of the present invention it is possible to provide increased support to an edge region of a glass sheet to be edge worked. Also, such a vacuum cup is able to provide improved support to a corner region of the glass sheet compared to a conventional circular or oval vacuum cup.

By configuring the elongate cavity such that the first end portion of the periphery of the elongate cavity is larger than the second end portion of the periphery of the elongate cavity, it is preferred that the periphery of the elongate cavity is not symmetrical about a line bisecting the major axis of the periphery of the elongate cavity and being orthogonal thereto.

The major axis of the periphery of the elongate cavity may also be referred to as the length of the periphery of the elongate cavity.

The minor axis of the periphery of the elongate cavity may also be referred to as the width of the periphery of the elongate cavity.

Between the first and second portions of the periphery of the elongate cavity, the periphery of the elongate cavity has a central portion having a first side and a second side, preferably wherein the first side of the central portion of the periphery of the elongate cavity is not parallel with the second side of the central portion of the periphery of the elongate cavity.

Preferably the first side of the central portion of the periphery of the elongate cavity is straight, or substantially straight.

Preferably the second side of the central portion of the periphery of the elongate cavity is straight, or substantially straight.

Preferably the periphery of the elongate cavity is symmetrical about the major axis thereof.

Preferably the first end portion of the periphery of the elongate cavity is curved.

Preferably the first end portion of the periphery of the elongate cavity is semi-circular, or substantially semi-circular.

Preferably the first end portion of the periphery of the elongate cavity is curved and has a radius of curvature greater than 40 mm, or between 41 mm and 400 mm, or between 41 mm and 300 mm, or between 41 mm and 200 mm, or between 41 mm and 100 mm, or between 41 mm and 80 mm.

Preferably the second end portion of the periphery of the elongate cavity is curved.

Preferably the second end portion of the periphery of the elongate cavity is semi-circular, or substantially semi-circular.

Preferably the second end portion of the periphery of the elongate cavity is curved and has a radius of curvature less than 40 mm, or between 5 mm and 40 mm, or between 10 mm and 40 mm, or between 20 mm and 40 mm.

Preferably the second end portion of the periphery of the elongate cavity is a portion of a circle having a radius of curvature less than 40 mm, or between 5 mm and 40 mm, or between 10 mm and 40 mm, or between 20 mm and 40 mm.

Preferably the body portion is of unitary construction, although the body portion may be made of more than one component part.

Preferably the body portion is made from a resilient material.

Preferably the body portion is made from an elastomeric material.

Preferably the body portion comprises one of the materials from the list consisting of natural rubber, synthetic rubber, silicone rubber and polyurethane.

Preferably the body portion comprises a material having a hardness Shore A DIN 53505 between 60 and 100, or 60 and 95.

Preferably the contact surface is a resilient surface.

Preferably the contact surface is flat.

The contact surface has a width and preferably the contact surface extends around the elongate cavity such that the width of the contact surface is substantially constant.

In some embodiments the body portion is enclosed in a holder and the holder has an opening therein in fluid communication with the opening in the body portion. Preferably the holder is made of a rigid material, in particular metal such as stainless steel or aluminium.

In some embodiments the first end portion of the periphery of the elongate cavity is semi-circular having a first and second end, and the second end portion of the periphery of the elongate cavity is curved or semi-circular having a first and second end, and the central portion between the first and second end portions of periphery of the elongate cavity has a first side between the first end of the semi-circular first end portion and the first end of the curved or semi-circular second end portion, and a second side between the second end of the semi-circular first end portion and the second end of the curved or semi-circular second end portion.

Preferably the first side of the central portion is straight, or substantially straight.

Preferably the second side of the central portion is straight, or substantially straight.

In some embodiments the periphery of the elongate cavity is key-hole shaped.

In some embodiments the periphery of the elongate cavity is egg-shaped, for example having an ovate shape.

In some embodiments the periphery of the elongate cavity is tear-drop shaped, for example such as a lanceolate shape.

In some embodiments the periphery of the elongate cavity is triangular shaped or a sector-shaped or a trullate shaped or trapezoidal shaped.

In some embodiments the elongate cavity has a plurality of channels therein.

Preferably one of the channels is parallel to the major axis or the minor axis.

Preferably the elongate cavity comprises at least one channel parallel to the minor axis and at least one channel parallel to the major axis.

In some embodiments the elongate cavity has a base and at least one raised portion extending from the base towards the contact surface.

Preferably at least one raised portion has a surface for contacting a glass sheet when the contact surface of the body portion contacts the glass sheet. The surface of the at least one raised portion for contacting the glass sheet when the contact surface of the body portion contacts the glass sheet may be referred to as a raised portion contact surface.

Preferably the raised portion contact surface of the at least one raised portion is coplanar with the contact surface.

Preferably one or more of the raised portions define at least one channel in the elongate cavity.

Preferably at least one of the channels is parallel to the major axis or the minor axis, Preferably the elongate cavity comprises at least one channel parallel to the minor axis formed by at least one raised portion and at least one channel parallel to the major axis formed by at least one raised portion.

The present invention also provides from a second aspect a method of processing a thin glass sheet comprising the steps: (i) providing a glass sheet having a first major surface and a second opposing major surface; (ii) providing at least one (a first) vacuum cup having a construction in accordance with the first aspect of the present invention; (iii) positioning the first vacuum cup on the first major surface of the glass sheet proximate a first edge portion of the glass sheet to be processed such that the first and second end portions of the periphery of the elongate cavity lie along the direction of the first edge portion and the contact surface contacts the first major surface of the glass sheet; (iv) communicating a low-pressure source with the opening to reduce the pressure in the chamber formed by the elongate cavity and the glass sheet, thereby supporting the glass sheet proximate the first edge portion; and (v) processing the first edge portion.

During step (iv), the contact surface of the body portion forms a seal with the first major surface of the glass sheet.

Preferably during step (v) the first edge portion is processed by a grinding step. The grinding step may be carried out using a conventional abrasive grinding wheel.

Preferably during step (v) the first edge portion is processed by applying a localised heat source to the first edge portion, for example a laser or a gas cutting torch.

In some embodiments during step (iii) and/or step (iv) a first side of a central portion of the periphery of the elongate cavity is adjacent the first edge portion of the glass sheet to be processed.

Preferably the first side of the central portion has a curvature to match the curvature of the adjacent first edge portion.

Preferably during step (iii) and/or step (iv) the first side of the central portion is parallel to the first edge portion of the glass sheet to be processed.

In some embodiments, prior to step (v) a second vacuum cup constructed in accordance with the first aspect of the present invention is provided and positioned on the first major surface of the glass sheet proximate a second edge portion of the glass sheet to be processed. The second edge portion and the first edge portion may be part of the same edge of the glass sheet, or the first edge portion may be at an angle to the second edge portion such that a corner portion of the glass sheet is supported by the first and second vacuum cups.

Preferably the first and second vacuum cups have the same construction.

Preferably the first and second vacuum cups are fed by a single low-pressure source.

Other embodiments of the second aspect of the present invention have other preferable features.

Preferably the glass sheet to be processed has a thickness less than 1 mm.

Preferably the glass sheet to be processed has a thickness greater than 0.2 mm.

Preferably the glass sheet to be processed has a thickness in the range 0.4 mm to 0.8 mm.

Preferably following step (v) the processed glass sheet is chemically strengthened using a suitable chemically strengthening process.

Preferably the glass sheet to be processed is an alkali aluminosilicate glass composition.

Preferably the glass sheet to be processed includes at least about 6 wt % aluminium oxide.

Preferably the glass sheet to be processed has a composition comprising 66-72 mol. % $SiO_2$, 1-4 mol. % $Al_2O_3$, 8-15 mol. % MgO, 1-8 mol. % CaO, 12-16 mol. % $Na_2O$, preferably wherein MgO+CaO is between 12 and 17 mol. % and CaO/(MgO+CaO) is in the range 0.1 and 0.4.

Preferably the glass sheet to be processed has a composition comprising (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

Preferably the glass sheet to be processed is a borosilicate glass composition.

The glass sheet processed following step (v) may be used as a ply in a laminated glazing, wherein the processed glass sheet is joined to another sheet of glass using an interlayer structure comprising at least one sheet of adhesive interlayer material such as polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

The processed glass sheet may be an inner ply or an outer ply in such a laminated glazing.

The invention will now be described with reference to the following figures (not to scale) in which, FIG. 1 shows a plan view of a body portion of a vacuum cup having an elongate cavity therein, in accordance with the present invention.

By way of background, it is known that vacuum cups (or suction cups) are often used as "grippers" in manual or automated handling applications. Vacuum cups can secure and help move a wide range of products such as bottles, bricks, wooden boards, sheet metal, pipes and glass sheets or windows. A vacuum cup essentially functions as an interface between a vacuum system and the workpiece.

As is known in the art, a vacuum cup does not attach itself and grip the surface of a product. Instead, when a suction cup contacts the workpiece surface, it typically activates a vacuum generator (such as a vacuum ejector, blower or pump) and draws out air from the cup interior and creates a vacuum. Given that air pressure inside is then lower than that outside of the cup, atmospheric pressure holds the workpiece against the cup (i.e. the cup is attached to the workpiece). The greater the difference between ambient pressure and vacuum pressure inside the cup, or the larger the effective area of the cup acting on the workpiece, the greater the holding force pressing the cup onto the workpiece.

Ideally, a vacuum cup should mate against a smooth, nonporous surface. Then, when generating vacuum, the cup rim completely seals against atmospheric air and the interior air may be quickly evacuated, resulting in a firm grip on the workpiece.

Flat suction cups are suited for handling workpieces with flat or slightly curved surfaces, such as metal and glass plates, plastic sheets and wooden boards. Flat cups usually have a small inner volume and, thus, evacuate quickly and can grip in a very short time.

Figure 1:
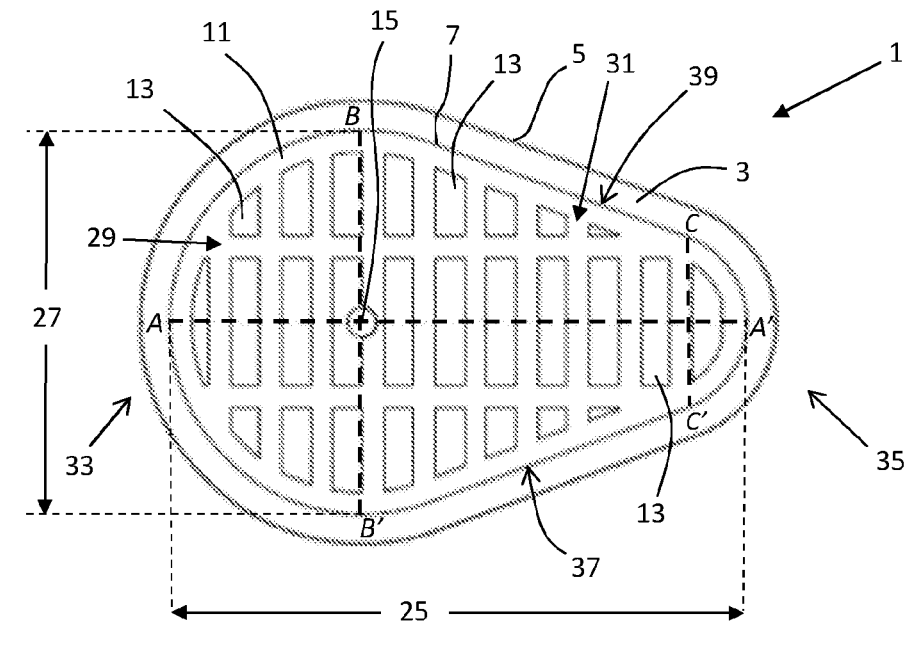

With reference to FIG. 1, there is shown a plan view of the underside of a body portion of a vacuum cup in accordance with the present invention. The underside of the body portion is that side which faces the major surface of a glass sheet when the vacuum cup is attached to the glass sheet.

The body portion 1 is preferably made from an elastomeric material such as silicone rubber and is preferably of unitary construction. The body portion may be made from a castable polyurethane material such as Adiprene®, Vulkollan® or Vibrathane and may have a hardness Shore A DIN 53505 between 60 and 100. The body portion 1 has a contact surface 3 for contacting a flat glass sheet to be processed. The contact surface is configured to contact a major surface of a glass sheet to form a chamber with the elongate cavity and the glass sheet.

Figure 2:
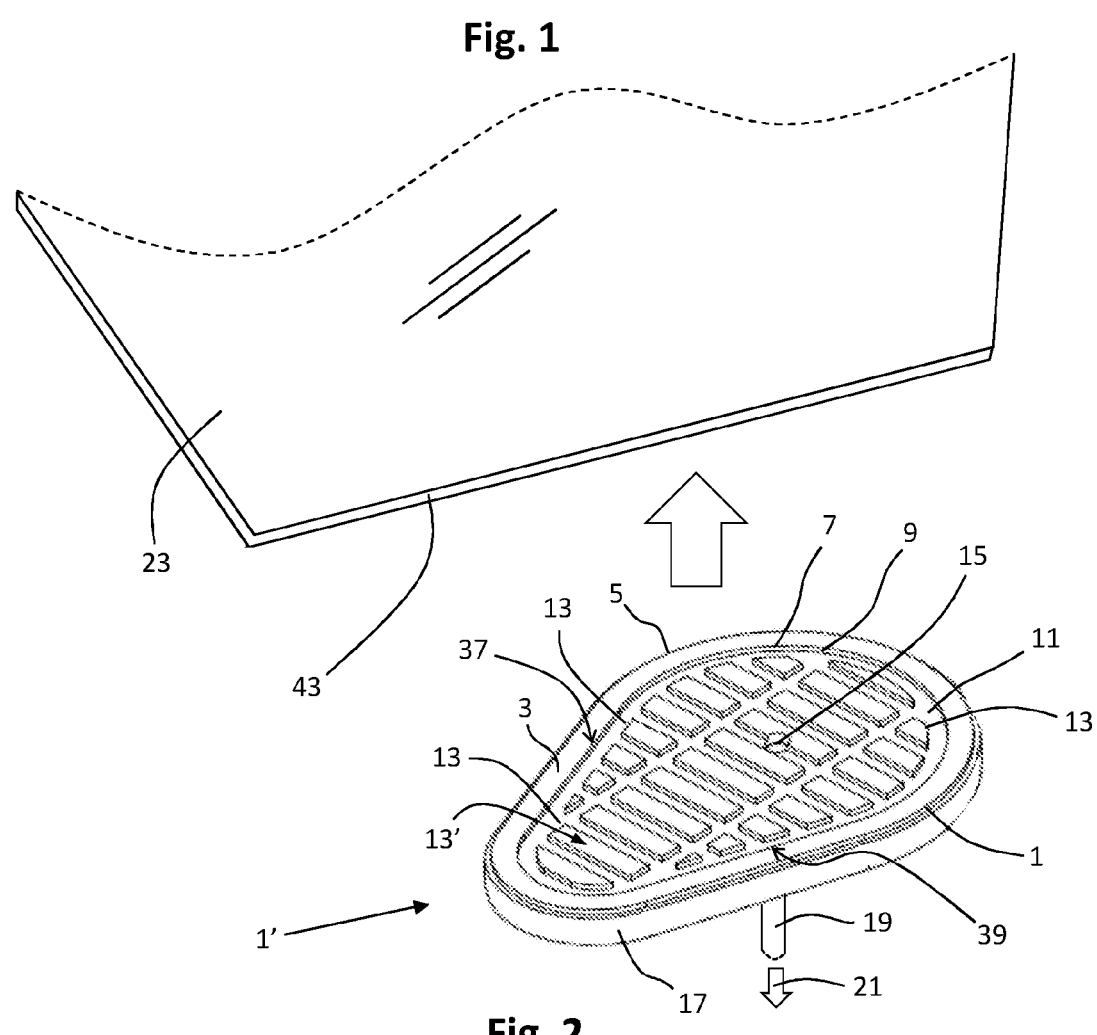
FIG. 2 shows a schematic isometric view of a vacuum cup having a body portion as shown in FIG. 1 positioned below a sheet of glass for subsequent processing the edge thereof.

With reference to FIGS. 1 and 2, the contact surface 3 has an outer edge 5 and an inner edge 7. The inner edge 7 surrounds an elongate cavity in the body portion. The spacing between the outer edge 5 and the inner edge 7 defines the width of the contact surface 3. It is preferred that the outer edge 5 is spaced apart from the inner edge 7 by a fixed amount such that the width of the contact surface 3 is constant. The elongate cavity has an inner wall 9 and a base 11. The intersection of the inner wall 9 with the contact surface 3 defines the inner edge 7. An outer wall (not labelled) intersects with the contact surface 3 to define the outer edge 5.

Located in the base 11 is an opening 15 that extends through the body portion for connection to a low-pressure source such as a vacuum pump. In this example the body portion 1 is fastened to a metal holder 17 using a suitable adhesive. A suitable metal for the metal holder 17 is aluminium. The body portion 1 in the metal holder 17 may be referred to as a vacuum cup (labelled 1'). The metal holder 17 surrounds the body portion 1 but is sized to allow the contact surface 3 to contact a glass sheet instead of the metal holder. A pipe 19 extends from the holder 17 and communicates with the opening 15 such that air may be drawn through the pipe 19 in the direction of arrow 21. When the body portion 1 is positioned on a sheet of glass (a portion of which is shown in FIG. 2 and labelled 23), the contact surface 3 contacts the glass surface to form a chamber with a portion of the glass sheet and the elongate cavity. Upon connecting the pipe 19 to a vacuum pump the contact surface 3 forms a seal with the glass surface and the body portion 1 becomes attached to the glass sheet due to the reduced pressure inside the chamber. The glass sheet 23 may then be supported by vacuum cup. Upon removing the low-pressure source from communication with the pipe 19, the body portion 1 may be removed from the glass sheet. The body portion 1 in the metal holder 17 may be referred to as the vacuum cup (labelled as 1' in FIG. 2).

The elongate cavity formed by the base 11 and inner wall 9 in plan view has a major axis shown as line A-A' that runs along the length of the body portion 1 between opposite portions of the inner wall 9. The elongate cavity also has a minor axis shown as line B-B' that runs along the width of the body portion between opposite portions of the inner wall 9. The major axis is orthogonal to the minor axis. The length 25 of the elongate cavity is equal to the length of the line A-A' and the width 27 of the elongate cavity is equal to the length of the line B-B'.

In this example the base 11 has a plurality of raised portions 13, only three of which are labelled in FIGS. 1 and 2. The raised portions 13 are arranged relative to the base 11 in to form an array of channels 29, 31. The channels 29 run parallel to the line A-A' and the channels 31 run parallel to the line B-B'. In FIG. 2, only one channel 29 is labelled and only one channel 31 is labelled.

The channels 29, 31 help provide a uniform low-pressure region in the chamber when the vacuum cup is attached to a glass sheet. The raised portions 13 preferably have a height to coincide with the height of the inner wall 9 (i.e. the ends 13' of the respective raised portions 13 at the end opposite the base 11 are coplanar with the contact surface 3) such that when the body portion 1 is positioned on a sheet of glass, the raised portions 13 also contact the glass sheet (in addition to the contact surface 3 contacting the glass sheet). This is further illustrated in FIG. 3. The additional contact from the ends 13' of the raised portions 13 helps increase the degree of attachment of the vacuum cup to the glass sheet when the pipe 19 is connected to a suitable low-pressure source and helps prevent deformation of the glass sheet inboard of the inner edge 7.

The periphery of the elongate cavity has a first end portion 33 at one end of the line A-A' and a second end portion 35 at the opposite end of the line A-A'. The first end portion 33 is larger than the second end portion 35. For example, by dividing the periphery of the elongate cavity into two parts using a line bisecting the major axis (line A-A') and being orthogonal thereto, the periphery of the elongate cavity is non-symmetrical about the bisecting line.

Between the first and second end portions 33, 35, the periphery of the elongate cavity has a central portion. On one side the central portion begins at point B and extends down to point C. On the opposite side, the central portion begins at point B' and extends down to point C'. The points B, B' are on the periphery of the elongate cavity (and used to define the minor axis). The points C, C' are also on the periphery of the elongate cavity and the line C-C' joining the points C, C' is orthogonal to the line A-A' and parallel to the line B-B'.

With reference to the orientation of the periphery of the elongate cavity as shown in FIG. 1, the first end portion 33 is on left hand side of the line B-B' and the second end portion 35 is on the right-hand side of the line C-C'.

In this example the first end portion 33 is curved being semi-circular having a radius of curvature of about 60 mm. The length of the periphery of the elongate cavity between the point B and B' is therefore about ($\pi \times 60$) mm=188 mm. The second end portion 35 is also curved and is a portion of a semicircle having a radius of curvature about 30 mm. If the end portion 35 was semi-circular having a radius of curvature of about 30 mm, the length of the periphery of the elongate cavity between the point C and C' would therefore be about ($\pi \times 30$) mm=94 mm (which is less than 188 mm). Given the end portion 35 is not fully semi-circular, the length periphery of the elongate cavity between the point C and C' is therefore less than 94 mm, being about 70 mm (which is also less than 188 mm).

Similarly, the area of the semi-circular first end portion is about ½ ($\pi \times 60 \times 60$) mm²=5,655 mm². For a semi-circular second end portion having a radius of curvature of 30 mm the area of such a second end portion is about ½ ($\pi \times 30 \times 30$) mm²=1,414 mm² (which is less than 5,655 mm²).

Connecting the first end portion 33 to the second end portion 35 the periphery of the elongate cavity has a first side 37 (between points B' and C') and a second side 39 (between point B and C). The first and second sides 37, 39 are both straight and non-parallel. The central portion of the periphery of the elongate cavity comprises the first and second sides 37, 39.

In use, it is preferred that the first side 37 or the second side 39 be adjacent an edge of a glass sheet to be edge worked, for example with reference to FIG. 2, the second edge 39 will be adjacent to the edge 43 of the glass sheet 23 when the vacuum cup 1' is attached to the glass sheet 23.

Figure 3:
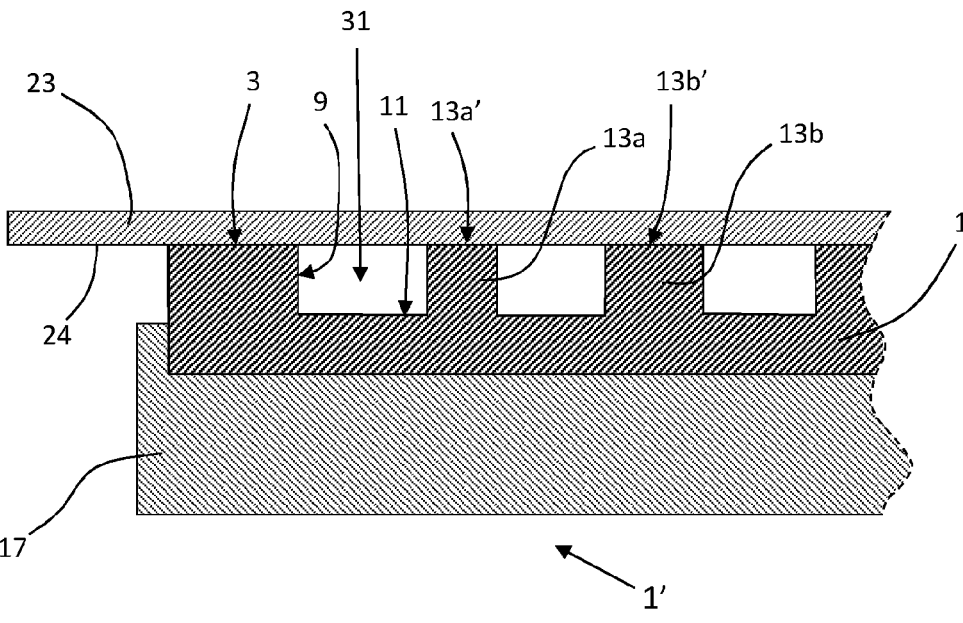
FIG. 3 shows a schematic cross-sectional view of a vacuum cup attached to a sheet of glass.

FIG. 3 shows a schematic cross-sectional view (along the major axis i.e. line A-A') of a portion of the vacuum cup 1' attached to a glass sheet. The pipe 19 (not shown in FIG. 3) has been connected to a suitable low-pressure source.

In FIG. 3 (and also with reference also to FIG. 1 and FIG. 2), the body portion 1 is shown in the metal holder 17. The body portion 1 is shown attached to the lower major surface 24 of sheet of glass 23. The contact surface 3 of the body portion 1 is in contact with the lower major surface 24 of the sheet of glass 23 and forms a seal therewith due to the provision of the low-pressure source to pipe 19.

The inner wall 9 can be seen to extend vertically upwards from the base 11 to intersect with the contact surface 3 forming inner edge 7. The location of the outer edge 5 defines the width of the contact surface 3. Preferably the width of the contact surface 3 is substantially constant around the periphery of the elongate cavity.

Also extending vertically from the base 11 are raised portions 13a and 13b (two of the plurality of raised portions 13). The raised portion 13a has a contact surface 13a' (i.e. raised portion contact surface 13a') in contact with the lower major surface 24 of the glass sheet 23. The raised portion 13b has a contact surface 13b' (i.e. raised portion contact surface 13b') in contact with the lower major surface of the glass sheet 23. The respective contact surface of each of the raised portions prevents deformation of the glass sheet and allows the provision of a vacuum over the whole surface of the suction cup.

Only one of the channels 31 is labelled in FIG. 3 and can be seen to be formed between the inner wall 9, a portion of the base 11 and a surface of the raised portion 13a facing the inner wall 9.

Figure 4:
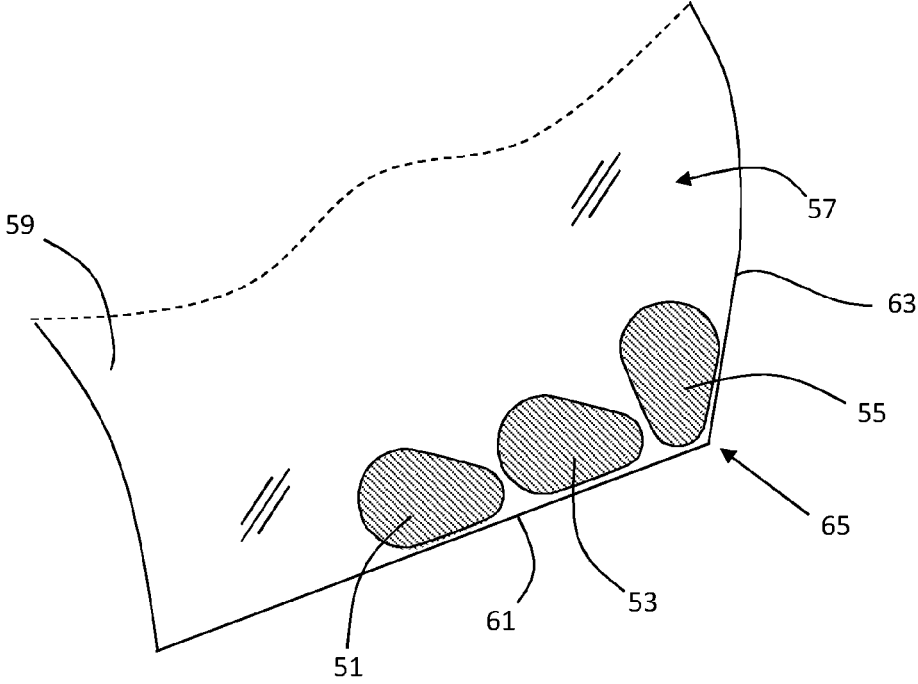
FIG. 4 shows a schematic plan view of three vacuum cups of the type shown in FIG. 2 shown supporting an edge region and a corner region of a glass sheet.

FIG. 4 shows three vacuum cups 51, 53, 55 attached to a major surface 57 of a sheet of glass 59 (for example in the same way as shown for vacuum cup 1' in FIG. 3).

The sheet of glass 59 has a first peripheral edge 61 the intersects with a second peripheral edge 63 forming a corner portion 65 of the glass sheet.

The vacuum cups 51, 53 are proximate the first peripheral edge 61 and lie in the direction of the first peripheral edge. A straight side of the elongate cavity of the vacuum cup 51 and a straight side of the elongate cavity of the vacuum cup 53 is adjacent the first peripheral edge 61. Due to the elongate cavity in the vacuum cups 51, 53, the glass sheet 59 is better supported so that it is simpler to perform a glass edge grinding operation of the first peripheral edge 61.

The vacuum cup 55 is proximate the second peripheral edge 63 and lies in the direction of the second peripheral edge. That is, the major axis of the elongate cavity of the vacuum cup 55 is substantially aligned with the second peripheral edge. A straight side of the elongate cavity of the vacuum cup 55 is adjacent the second peripheral edge 63. The vacuum cups 53, 55 provide improved support of the corner portion 65 allowing easier processing (i.e. edge grinding) of the first and second peripheral edges 61, 63 in the region of the corner portion 65.

Although only three vacuum cups are shown attached to the sheet of glass, there may be additional vacuum cups attached to the glass sheet to support other edge regions thereof, or to support more central regions of the glass sheet. For example, an additional vacuum cup may be attached to a central regions of the major surface 57 of the glass sheet 59 inboard the vacuum cups 51, 53.

Figure 5:
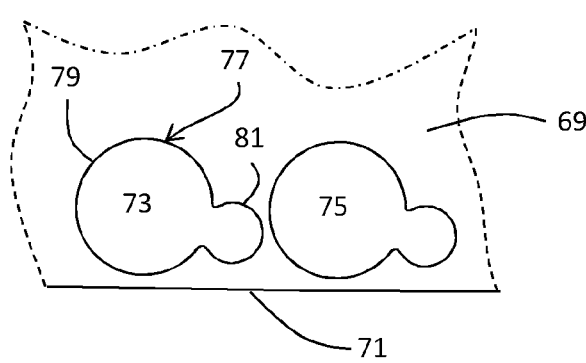
FIG. 5 shows a schematic plan view of two vacuum cups proximate an edge region of a glass sheet.

FIG. 5 shows two vacuum cups configured in accordance with the present invention attached to a sheet of glass 69 proximate a first peripheral edge 71. The first vacuum cup 73 has a body portion having an elongate cavity 77 therein. The elongate cavity 77 has a first end portion 79 and a second end portion 81. The first end portion 79 is larger than the second end portion 81. The vacuum cup 75 is configured in a similar manner. A central region between the first and second end portions 79, 81 has curved, non-parallel sides.

Figure 6:
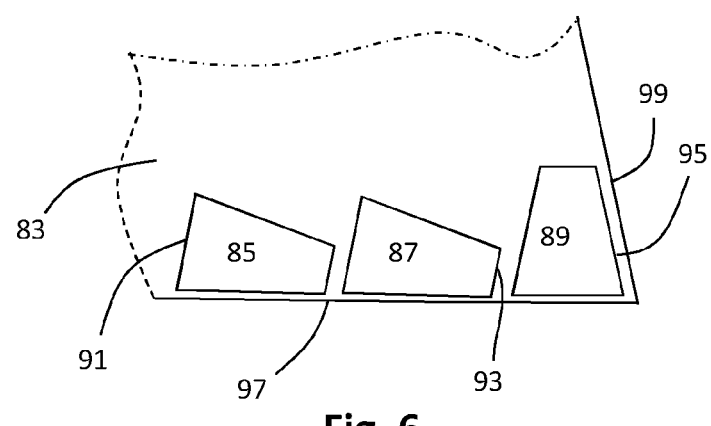
FIG. 6 shows a schematic plan view of three vacuum cups shown supporting an edge region and a corner region of a glass sheet.

FIG. 6 shows three vacuum cups configured in accordance with the present invention attached to a sheet of glass 83. The vacuum cups 85, 87, 89 each has a respective elongate cavity 91, 93, 95 having a periphery with four straight sides arranged as a trapezium shape. The vacuum cups 85, 87 are proximate a first peripheral edge 97 of the glass sheet 83 and the vacuum cup 89 is proximate a second peripheral edge 99 of the glass sheet 83.

Figure 7:
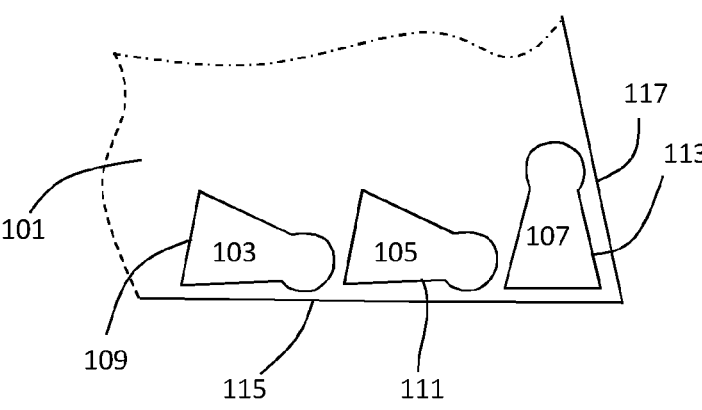
FIG. 7 shows a schematic plan view of three vacuum cups shown supporting an edge region and a corner region of a glass sheet.

FIG. 7 shows three vacuum cups configured in accordance with the present invention attached to a sheet of glass 101. The vacuum cups 103, 105, 107 each has a respective elongate cavity 109, 111, 113 having a periphery that is key-hole shaped, there being a portion of a circle at one end connected to a portion of a trapezium at the other end. The vacuum cups 103, 105 are proximate a first peripheral edge 115 of the glass sheet 101 and the vacuum cup 107 is proximate a second peripheral edge 117 of the glass sheet 101.

The glass sheet 23, 59, 69, 83, 101 once processed (i.e. having at least one edge subject to a grinding process) may be further processed, for example by washing, heat treating, chemically strengthening, coating etc.

The glass sheet following edge working (and any other subsequent processing) may be used as a ply in a laminated glazing, which may be flat or curved in at least one direction. Preferably the radius of curvature in the at least one direction is between 500 mm and 20000 mm, more preferably between 1000 mm and 8000 mm.

In the preceding examples the glass sheet may be a soda-lime-silica glass composition. A typical soda-lime-silica glass composition is (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2%; $Fe_2O_3$ 0.005-2%. Such a glass may be manufactured using the float process.

Alternatively, the glass sheet to be processed may be an alkali aluminosilicate glass composition and may include at least about 6 wt % aluminium oxide.

Other glass compositions may be used, for example a borosilicate glass composition.

The present invention therefore provides from a first aspect a vacuum cup comprising a body portion having an elongate cavity therein and a contact surface for contacting a glass sheet to form a chamber with the elongate cavity and the glass sheet. The elongate cavity has a periphery and the contact surface has an edge facing into the elongate cavity defining the periphery of the elongate cavity. An opening in the body portion is in fluid communication with the elongate cavity for connection to a low-pressure source so that the contact surface can form a seal with the glass sheet to attach the vacuum cup to the glass sheet. The periphery of the elongate cavity has major and minor axes orthogonal to one another, the major axis being longer than the minor axis. The periphery of the elongate cavity has first and second end portions at respective ends of the major axis. The first end portion of the periphery of the elongate cavity is larger than the second end portion of the periphery of the elongate cavity.

The present invention finds particular application in the field of vehicle glazings, where an edge region of a thin glass sheet in a glazing pane requires suitable edge working. The thin glass sheet, for example having a thickness between 0.4 mm and 0.9 mm is usually laminated to another thicker glass sheet (having a thickness in the range 1.5 mm to 10 mm) using an interlayer structure comprising a sheet of adhesive material such as polyvinyl butyral. The edge worked edge of the thin glass sheet of the laminated glazing may be exposed in use, for example an upper edge region of a movable vehicle side window. By using vacuum cups in accordance with the present invention it is possible to provide better support to the outer peripheral edge of the glass sheet and/or in corner regions of the glass sheet during edge working.

The invention claimed is:

1. A vacuum cup comprising:
a body portion comprising an elongate cavity and a contact surface extending around the elongate cavity for contacting a glass sheet and forming a chamber with the elongate cavity and the glass sheet;
the elongate cavity having a periphery and the contact surface having an edge facing into the elongate cavity to define the periphery of the elongate cavity;
there being an opening in the body portion in fluid communication with the elongate cavity such that when the chamber is formed with the glass sheet and a low-pressure source is connected to the opening in the body portion, the contact surface forms a seal with the glass sheet to attach the vacuum cup to the glass sheet;
wherein the periphery of the elongate cavity has a major axis and a minor axis orthogonal to the major axis, the major axis being longer than the minor axis,
further wherein the periphery of the elongate cavity has a first end portion at one end of the major axis and a second end portion at the opposite end of the major axis, wherein the first end portion of the periphery of the elongate cavity is larger than the second end portion of the periphery of the elongate cavity,
wherein between the first and second end portions of the periphery of the elongate cavity, the periphery of the elongate cavity has a central portion having a first side and a second side,
wherein the first side of the central portion of the periphery of the elongate cavity is not parallel with the second side of the central portion of the periphery of the elongate cavity.

2. A vacuum cup according to claim 1, wherein the first side of the central portion of the periphery of the elongate cavity is straight, or substantially straight.

3. A vacuum cup according to claim 2, wherein the second side of the central portion of the periphery of the elongate cavity is straight, or substantially straight.

4. A vacuum cup according to claim 1, wherein the periphery of the elongate cavity is symmetrical about the major axis thereof.

5. A vacuum cup according to claim 1, wherein the first end portion of the periphery of the elongate cavity is curved and/or wherein the second end portion of the periphery of the elongate cavity is curved.

6. A vacuum cup according to claim 5, wherein the first end portion of the periphery of the elongate cavity is curved and has a radius of curvature greater than 40 mm and/or wherein the second end portion of the periphery of the elongate cavity is curved and has a radius of curvature less than 40 mm.

7. A vacuum cup according to claim 1, wherein the body portion is of unitary construction and/or wherein the body portion is made from a resilient material.

8. A vacuum cup according to claim 1, wherein the contact surface is a resilient surface.

9. A vacuum cup according to claim 1, wherein the elongate cavity has a base and at least one raised portion extending from the base towards the contact surface.

10. A vacuum cup according to claim 9, wherein at least one raised portion has a surface for contacting a glass sheet when the contact surface of the body portion contacts the glass sheet.

11. A method of processing a thin glass sheet comprising:

(i) providing a glass sheet having a first major surface and a second opposing major surface;

(ii) providing a first vacuum cup having a construction in accordance with claim 1;

(iii) positioning the first vacuum cup on the first major surface of the glass sheet proximate a first edge portion of the glass sheet to be processed such that the first and second end portions of the periphery of the elongate cavity lie along the direction of the first edge portion and the contact surface contacts the first major surface of the glass sheet;

(iv) communicating a low-pressure source with the opening to reduce the pressure in the chamber formed by the elongate cavity and the glass sheet, thereby supporting the glass sheet proximate the first edge portion; and (v) processing the first edge portion.

12. A method according to claim 11, wherein during the processing of the first edge portion, the first edge portion is processed by a grinding step or by applying a localised heat source to the first edge portion.

13. A method according to claim 11, wherein during the positioning of the first vacuum cup on the first major surface of the glass sheet and/or during the communicating of the low-pressure source with the opening, a first side of a central portion of the periphery of the elongate cavity is adjacent the first edge portion of the glass sheet to be processed.

14. A method according to claim 13, wherein the first side of the central portion has a curvature to match the curvature of the adjacent first edge portion.

15. A method according to claim 13, wherein during the positioning of the first vacuum cup on the first major surface of the glass sheet and/or during the communicating of the low-pressure source with the opening, the first side of the central portion is parallel to the first edge portion of the glass sheet to be processed.

16. A method according to claim 11, wherein prior to the processing of the first edge portion, a second vacuum cup constructed similar to the first vacuum cup is positioned on the first major surface of the glass sheet proximate a second edge portion of the glass sheet to be processed.

17. A method according to claim 11, wherein following the processing of the first edge portion, the processed glass sheet is chemically strengthened using a chemical strengthening process and/or the processed glass is used as a ply in a laminated glazing where the processed glass sheet is joined to another sheet of glass using an interlayer structure comprising at least one sheet of adhesive interlayer material.

* * * * *